Reissued June 25, 1940

Re. 21,486

UNITED STATES PATENT OFFICE 21,486

CONVERSION OF HYDROCARBONS

Aristid V. Grosse, Chicago, Ill., assignor to Universal Oil Products Company, Chicago, Ill., a corporation of Delaware No Drawing. Original No. 2,124,567, dated July 26, 1938, Serial No. 105,717, October 15, 1936, Application for reissue September 15, 1939, Serial No. 295,112

8 Claims. (Cl. 260—668)

This invention relates particularly to the conversion of straight chain hydrocarbons into closed chain or cyclic hydrocarbons.

More specifically, it is concerned with a process involving the use of special catalysts and specific conditions of operation in regard to temperature, pressure and time of reaction whereby aliphatic hydrocarbons can be efficiently converted into aromatic hydrocarbons.

In the straight pyrolysis of pure hydrocarbons or hydrocarbon mixtures such as those encountered in fractions from petroleum or other naturally occurring or synthetically produced hydrocarbon mixtures the reactions involved which produce aromatics from paraffins and olefins are of an exceedingly complicated character and cannot be very readily controlled.

It is generally recognized that, in the thermal decomposition of hydrocarbon compounds or hydrocarbon mixtures of relatively narrow range that whatever intermediate reactions are involved, there is an overall loss of hydrogen, a tendency to carbon separation and a generally wider boiling range in the total liquid products as compared with the original charge. Under mild cracking conditions involving relatively low temperatures and pressures and short times of exposure to cracking conditions it is possible to some extent to control cracking reactions so that they are limited to primary decompositions and there is a minimum loss of hydrogen and a maximum production of low boiling fractions consisting of compounds representing the fragments of the original high molecular weight compounds.

As the conditions of pyrolysis are increased in severity using higher temperatures and higher times of exposure to pyrolytic conditions, there is a progressive increase in loss of hydrogen and a large amount of secondary reactions involving recombination of primary radicals to form polymers and some cyclization to form naphthenes and aromatics, but the mechanisms involved in these cases are of so complicated a nature that very little positive information has been evolved in spite of the large amount of experimentation which has been done and the large number of theories proposed. In general, however, it may be said that, starting with paraffin hydrocarbons representing the highest degree of saturation, these compounds are changed progressively into olefins, naphthenes, aromatics, and finally into carbon and hydrogen and other light fixed gases. It is not intended to infer from this statement that any particular success has attended the conversion of any given paraffin or other aliphatic hydrocarbon into an aromatic hydrocarbon of the same number of carbon atoms by way of the progressive steps shown. If this is done it is usually with very low yields which are of very little or no practical significance.

The search for catalysts to specifically control and accelerate desired conversion reactions among hydrocarbons has been attended with the usual difficulties encountered in finding catalysts for other types of reactions since there are no basic laws or rules for predicting the effectiveness of catalytic materials and the art as a whole is in a more or less empirical state. In using catalysts even in connection with conversion reactions among pure hydrocarbons and particularly in connection with the conversion of the relatively heavy distillates and residua which are available for cracking, there is a general tendency for the decomposition reactions to proceed at a very rapid rate, necessitating the use of extremely short time factors and very accurate control of temperature and pressure to avoid too extensive decomposition. There are further difficulties encountered in maintaining the efficiency of catalysts employed in pyrolysis since there is usually a rapid deposition of carbonaceous materials on their surfaces and in their pores.

The foregoing brief review of the art of hydrocarbon pyrolysis is given to furnish a general background for indicating the improvement in such processes which is embodied in the present invention, which may be applied to the treatment of pure paraffin or olefin hydrocarbons, hydrocarbon mixtures containing substantial percentages of paraffin hydrocarbons such as relatively close cut fractions producible by distilling petroleum, and analogous fractions which contain unsaturated as well as saturated straight chain hydrocarbons, such fractions resulting from cracking operations upon the heavier fractions of petroleum.

In one specific embodiment the present invention comprises the conversion of aliphatic hydrocarbons including paraffin and olefin hydrocarbons into aromatic hydrocarbons by subjecting them at elevated temperatures of the order of 400–700° C., to contact for definite times of the order of 6–50 seconds with catalytic materials comprising major proportions of aluminum oxide of relatively low catalytic activity supporting minor proportions of oxides of elements selected from those occurring in the lefthand columns of group VI of the periodic table, these oxides having relatively high catalytic activity.

According to the present invention aliphatic or straight chain hydrocarbons having 6 or more carbon atoms in chain arrangement in their structure are specifically dehydrogenated in such a way that the chain of carbon atoms undergoes ring closure with the production in the simplest case of benzene from n-hexane or n-hexene and in the case of higher molecular weight paraffins of various alkyl derivatives of benzene. Under properly controlled conditions of times of contact, temperature and pressure, very high yields of the order of 75 to 90% of the benzene or aromatic compounds are obtainable which are far in excess of any previously obtained in the art either with or without catalysts. For the sake of illustrating and exemplifying the types of hydrocarbon conversion reactions which are specifically accelerated under the preferred conditions by the present types of catalysts, the following structural equations are introduced:

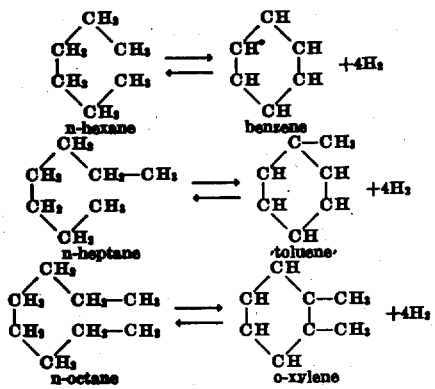

In the foregoing table the structural formulas of the primary paraffin hydrocarbons have been represented as a nearly closed ring instead of by the usual linear arrangement for the sake of indicating the possible mechanisms involved. No attempt has been made to indicate the possible intermediate existence of mono-olefins, diolefins, hexamethylenes or alkylated hexamethylenes which might result from the loss of various amounts of hydrogen. It is not known at the present time whether ring closure occurs at the loss of one hydrogen molecule or whether dehydrogenation of the chain carbons occurs so that the first ring compound formed is an aromatic such as benzene or one of its derivatives. The above three equations are of a relatively simple character indicating generally the type of reactions involved but in the case of n-paraffins or mono-olefins of higher molecular weight than the octane shown and in the case of branched chain compounds which contain various alkyl substituent groups in different positions along the six-carbon atom chain, more complicated reactions will be involved. For example, in the case of such a primary compound as 2,3-dimethyl hexane the principal resultant product is apparently o-xylene although there are concurrently produced definite yields of such compounds as ethyl benzene indicating an isomerization of two substituent methyl groups. In the case of nonanes which are represented by the compound 2,3,4-trimethyl hexane, there is formation not only of mesitylene but also of such compounds as methyl ethyl benzol and various propyl benzols.

It will be seen from the foregoing that the scope of the present invention is preferably limited to the treatment of aliphatic hydrocarbons which contain at least 6 carbon atoms in straight chain arrangement. In the case of paraffin hydrocarbons containing less than 6 carbon atoms in linear arrangement, some formation of aromatics may take place due to primary isomerization reactions although obviously the extent of this will vary considerably with the type of compound and the conditions of operation. The process is readily applicable to paraffins from hexane up to dodecane and their corresponding olefins. With increase in molecular weight beyond this point the percentage of undesirable side reactions tends to increase and yields of the desired alkylated aromatics decrease in proportion.

According to the present invention composite catalytic materials are employed which comprise in general major proportions by weight of granular activated aluminum oxide as a base catalyst or supporting material for minor proportions of oxides of the elements in the lefthand column of Group VI of the periodic table comprising the elements chromium, molybdenum and tungsten. The base material comprising aluminum oxide is of relatively low catalytic activity while the oxides of the elements mentioned are of relatively high catalytic activity and furnish by far the greater proportion of the observed catalytic effects. The oxides of these several elements vary somewhat in catalytic activity in any given reaction comprised within the scope of the invention and this variation may further vary in the case of different types of dehydrogenation and cyclization reactions. Some of the properties of these catalytically active oxides, which are developed on the surface and in the pores of the alumina particles will be described in succeeding paragraphs.

It should be emphasized that in the field of catalysis there have been very few rules evolved which would enable the prediction of what materials would catalyze a given reaction. Most of the catalytic work has been done on a purely empirical basis, even though at times certain groups of elements or compounds have been found to be more or less equivalent in accelerating certain types of reactions.

Aluminum oxide which is generally preferable as a base material for the manufacture of catalysts for the process may be obtained from natural aluminum oxide minerals or ores such as Bauxite or carbonates such as Dawsonite by proper calcination, or it may be prepared by precipitation of aluminum hydroxide from solutions of aluminum sulfate or different alums, and dehydration of the precipitate of aluminum hydroxide by heat. Usually it is desirable and advantageous to further treat it with air or other gases, or by other means to activate it prior to use.

Two hydrated oxides of aluminum occur in nature, to-wit, Bauxite having the formula $Al_2O_3.2H_2O$ and Diaspore $Al_2O_3.H_2O$. In both of these oxides iron sesqui-oxide may partially replace the alumina. These two minerals or corresponding oxides produced from precipitated aluminum hydroxide are particularly suitable for the manufacture of the present type of catalysts and in some instances have given the best results of any of the base compounds whose use is at present contemplated. The mineral Dawsonite having the formula $Na_2Al(CO_3)_3.2Al(OH)_3$ is another mineral which may be used as a source of aluminum oxide.

It is best practice in the final steps of preparing aluminum oxide as a base catalyst to ignite it for some time at temperatures within the approximate range of from 800–900° C. This probably does not correspond to complete dehydration of the hydroxide but apparently gives a catalytic material of good strength and porosity so that it is able to resist for a long period of time the deteriorating effects of the service and regeneration periods to which it is subjected.

My investigations have also definitely demonstrated that the catalytic efficiency of alumina, which has some catalytic potency in itself is greatly improved by the presence of oxides of the preferred elements in relatively minor amounts, usually of the order of less than 10% by weight of the carrier. It is most common practice to utilize catalysts comprising 2 to 5% by weight of these oxides, particularly the lower oxides.

The oxides which constitute the principal active catalytic materials may be deposited upon the surface and in the pores of the activated alumina granules by several alternate methods such as for example, the ignition of nitrates which have been adsorbed or deposited from aqueous solution by evaporation or by a similar ignition of precipitated hydroxides. As an alternative method though obviously less preferable, the finely divided oxides may be mixed mechanically with the alumina granules either in the wet or the dry condition. The point of achieving the most uniform practical distribution of the oxides on the alumina should constantly be borne in mind since the observed catalytic effects evidently depend principally upon a surface action.

The element chromium has three oxides, the trioxide $CrO_3$, the dioxide $CrO_2$ and the sesquioxide $Cr_2O_3$, the last-named being readily produced by heating the trioxide in hydrogen or hydrocarbon vapors at a temperature of 250° C. The dioxide has been considered to be an equimolecular mixture of the trioxide and the sesquioxide. The oxides are readily developed on the surfaces and pores of alumina granules by utilizing primary solutions of chromic acid $H_2CrO_4$ or chromium nitrate $Cr(NO_3)_3$. The ignition of the chromic acid, the nitrate or a precipitated trihydroxide produces primarily the trioxide which is then reduced to the sesquioxide to furnish an active catalyst for use in reactions of the present character.

The two most important oxides of molybdenum which are alternatively employed as catalysts according to the present invention are the dioxide $MoO_2$ and sesquioxide $Mo_2O_3$. Since the reduction of the trioxide by hydrogen begins at 300° C. (572° F.) and the reduction is rapid at 450° C. (842° F.) the effective catalytic material is principally the sesquioxide. The trioxide may be added to the active alumina carrier from a solution in aqueous ammonia or from a solution of ammonium molybdate which are added in amounts just requisite to wet the carrier granules uniformly and the mass is then dried and ignited.

The element tungsten has three oxides: the trioxide $WO_3$, the dioxide $WO_2$ and the sesquioxide $W_2O_3$. The trioxide is readily soluble in aqueous ammonia from which it may be deposited upon active alumina granules and it is ordinarily reduced preliminary to service by the action of hydrogen at a red heat. Tungstic acids may be precipitated from aqueous solution to form the hydrated oxides and these may be heated to drive off water and leave a residue of oxides on the carrier particles.

In regard to uranium, which is the heaviest member of the present natural group of elements whose oxides are preferred as catalysts, it may merely be stated that while this element furnished catalytic oxides having some order of catalytic activity, its scarcity and cost naturally precludes its extensive use in practice.

It has been found essential to the production of high yields of aromatics from aliphatic hydrocarbons when using the preferred types of catalysts that depending upon the aliphatic hydrocarbon or mixture of hydrocarbons being treated, temperatures from 400–700° C. Should be employed, contact times of approximately 6 to 50 seconds and pressures approximating atmospheric. The use of subatmospheric pressures of the order of ¼ atmosphere may be beneficial in that reduced pressures generally favor selective dehydrogenation reactions but on the other hand moderately superatmospheric pressures usually of the order of less than 100 lbs., per square inch tend to increase the capacity of commercial plant equipment so that in practice a balance is struck between these two factors. The times of contact most commonly employed with n-paraffinic or mono-olefinic hydrocarbons having from 6–12 carbon atoms to the molecule are of the order of 8–20 seconds. It will be appreciated by those familiar with the art of hydrocarbon conversion in the presence of catalysts that the factors of temperature, pressure and time will frequently have to be adjusted from the results of preliminary experiments to produce the best results in any given instance. The criterion of the yield of aromatics will serve to fix the best conditions of operation. In a general sense the relations between time, temperature and pressure are preferably adjusted so that rather intensive conditions are employed of sufficient severity to insure a maximum amount of the desired cyclization reactions with a minimum of undesirable side reactions. If too short times of contact are employed the conversion reactions will not proceed beyond those of simple dehydrogenation and the yields of olefins and diolefins will predominate over those of aromatics.

While the present process is particularly applicable to the production of the corresponding aromatics from an aliphatic hydrocarbon or a mixture of aliphatic hydrocarbons, the invention may also be employed to produce aromatics from aliphatic hydrocarbon mixtures such as distillates from paraffinic or mixed base crude petroleum. In this case the aromatic character of the distillates will be increased and as a rule the octane number will be higher. If desired and found feasible on a basis of concentration, the aromatics produced in the hydrocarbon mixtures may be recovered as such by distillation into fractions of proper boiling range followed by chemical treatment with reagents capable of reacting selectively with them. Another method of aromatic concentration will involve the use of selective solvents such as liquid sulfur dioxide, alcohols, furfural, chlorex, etc.

In operating the process the general procedure is to vaporize hydrocarbons or mixtures of hydrocarbons and after heating the vapors to a suitable temperature within the ranges previously specified, to pass them through stationary masses of granular catalytic material in vertical cylindrical treating columns or banks of catalyst-containing tubes in parallel connection. Since the reactions are endothermic it may be necessary to apply some heat externally to maintain the best reaction temperature. After passing through the catalytic zone the products are submitted to fractionation to recover cuts or fractions containing the desired aromatic product with the separation of fixed gases, unconverted hydrocarbons and heavier residual materials, which may be disposed of in any suitable manner depending upon their composition. The overall yield of aromatics may be increased by recycling the unconverted straight chain hydrocarbons to further treatment with fresh material, although this is a more or less obvious expedient and not specifically characteristic of the present invention.

It is an important feature of the present process that the vapors undergoing dehydrogenation should be free from all but traces of water vapor since the presence of any substantial amounts of steam reduces the catalytic selectivity of the composite catalyst to a marked degree. In view of the empirical state of the catalytic art, it is not intended to submit a complete explanation of the reasons for the deleterious influence of water vapor on the course of the present type of catalyzed reactions, but it may be suggested that the action of the steam may be to cause a partial hydration of alumina and some of the catalytic oxides due to preferential adsorption so that in effect the hydrocarbons are prevented from reaching or being adsorbed by the catalytically active surface.

The present types of catalysts are particularly effective in removing hydrogen from chain compounds in such a way that cyclization may be promoted without removal of hydrogen from end carbon atoms so that both end and side alkyl groups may appear as substituents in benzene rings and it has been found that under proper operating conditions they do not tend to promote any great amount of undesirable side reactions leading to the deposition of carbon or carbonaceous materials and for this reason show reactivity over relatively long periods of time. When their activity begins to diminish after a period of service, it is readily regenerated by the simple expedient of oxidizing with air or other oxidizing gas at a moderately elevated temperature, usually within the range employed in the dehydrogenation and cyclization reactions. This oxidation effectively removes traces of carbon deposits which contaminate the surface of the particles and decrease their efficiency. It is characteristic of the present types of catalysts that they may be repeatedly regenerated with only a very gradual loss of catalytic efficiency.

During oxidation with air or other oxidizing gas mixture in regenerating partly spent material, there is evidence to indicate that the lower oxides are to a large extent, if not completely, oxidized to higher oxides which combine with aluminum oxide to form aluminum salts of variable composition. Later these salts are decomposed by contact with reducing gases in the first stages of service to reform the lower oxides and regenerate the real catalyst and hence the catalytic activity.

*Example I*

In this example an ultimate yield of over 90% benzol was produced by the catalytic conversion of a n-haxane fraction obtained from a highly paraffinic crude petroleum by close fractionation. The catalyst comprised an alumina base supporting about 4% by weight of chromium sesquioxide which had been developed on the carrier particles by the ignition of chromium nitrate and the reduction of the primary trioxide by hydrogen at a temperature of 250–300° C. The hexane fraction was passed through a bed of this catalyst at a temperature of 525° C., atmospheric pressure and a time of contact of 20 seconds to produce a once-through yield of about 47%. The final yield after recycling unconverted hexane several times was above 90% as previously stated.

*Example II*

In this case n-heptane was converted to toulene utilizing a catalyst supporting molybdenum oxides on the preferred alumina base. The catalyst was made by utilizing a solution of ammonium molybdate in an excess of ammonia and adding the concentrated solution to about three times its weight of granular alumina particles followed by careful mixing and calcining to drive off water and ammonia and leave a residue of the trioxide. Before service the particles were treated with hydrogen at about 450° C. to reduce a material portion of the trioxide to lower oxides such as the sesquioxide.

n-Heptane was passed over a bed of the catalyst particles at a temperature of 555° C., atmospheric pressure and 13 seconds contact time to produce a yield of approximately 50% of toluene on a once-through basis, this yield being finally raised to about 80% by complete recycling of unconverted material.

*Example III*

This example is given to illustrate the direct formation of toluene from n-heptane, which conversion was accomplished using the catalyst similar to that described under Example II, a temperature of 510° C., atmospheric pressure and a time of contact of approximately 20 seconds. The once-through yield of toluene was 76% and the ultimate yield was in the neighborhood of 93–95% by recycling unconverted olefin.

*Example IV*

To prepare the catalyst an ammoniacal aqueous solution of tungsten trioxide was used to deposit the trioxide upon an activated alumina. After reduction with hydrogen, analyses showed there was present from 4–5% of mixed tungsten oxides.

Using the above catalyst the vapors of n-heptane were treated at a temperature of 560° C., substantially atmospheric pressure, and 15 seconds contact time to produce a yield of 46% to toluene on a once-through basis which was finally brought to about a 76% ultimate yield after several recyclings of unconverted charge.

The foregoing specification and examples show clearly the character of the invention and the results to be expected in its application to aliphatic hydrocarbons, although neither section is intended to be unduly limiting.

I claim as my invention:

1. A process for the production of aromatic hydrocarbons from aliphatic hydrocarbons of from six to twelve carbon atoms, which comprises dehydrogenating and cyclicizing the aliphatic hydrocarbon by subjection to a temperature of the order of 400 to 700° C., for a period of about 6 to 50 seconds, in the presence of an aluminum oxide catalyst containing a relatively small amount of an oxide of a metal from the left hand column of Group VI of the periodic table and selected from the class consisting of chromium, molybdenum, tungsten and uranium.

2. A process for the production of aromatic hydrocarbons from aliphatic hydrocarbons of from six to twelve carbon atoms, which comprises dehydrogenating and cyclicizing the aliphatic hydrocarbon by subjection to a temperature of the order of 400 to 700° C., for a period about 6 to 50 seconds, in the presence of an aluminum oxide catalyst containing a relatively small amount of an oxide of chromium.

3. A process for the production of aromatic hydrocarbons from aliphatic hydrocarbons of from six to twelve carbon atoms, which comprises dehydrogenating and cyclicizing the aliphatic hydrocarbon by subjection to a temperature of the order of 400 to 700° C., for a period of about 6 to 50 seconds, in the presence of an aluminum oxide catalyst containing a relatively small amount of an oxide of molybdenum.

4. A process for the production of aromatic hydrocarbons from aliphatic hydrocarbons of from six to twelve carbon atoms, which comprises dehydrogenating and cyclicizing the aliphatic hydrocarbon by subjection to a temperature of the order of 400 to 700° C., for a period of about 6 to 50 seconds, in the presence of an aluminum oxide catalyst containing a relatively small amount of an oxide of tungsten.

5. A process for the production of aromatic hydrocarbons from aliphatic hydrocarbons of from six to twelve carbon atoms, which comprises dehydrogenating and cyclicizing the aliphatic hydrocarbon by subjection to a temperature of the order of 400 to 700° C., for a time period of less than 50 seconds but sufficient to dehydrogenate and cyclicize the aliphatic hydrocarbon, in the presence of an aluminum oxide catalyst containing a relatively small amount of an oxide of a metal from the left hand column of Group VI of the periodic table and selected from the class consisting of chromium, molybdenum, tungsten and uranium.

6. A process for the production of aromatic hydrocarbons from aliphatic hydrocarbons of from six to twelve carbon atoms, which comprises dehydrogenating and cyclicizing the aliphatic hydrocarbon by subjection to a temperature of the order of 400 to 700° C., for a time period of less than 50 seconds but sufficient to dehydrogenate and cyclicize the aliphatic hydrocarbon, in the presence of an aluminum oxide catalyst containing a relatively small amount of an oxide of chromium.

7. A process for the production of aromatic hydrocarbons from aliphatic hydrocarbons of from six to twelve carbon atoms, which comprises dehydrogenating and cyclicizing the aliphatic hydrocarbon by subjection to a temperature of the order of 400 to 700° C., for a time period of less than 50 seconds but sufficient to dehydrogenate and cyclicize the aliphatic hydrocarbon, in the presence of an aluminum oxide catalyst containing a relatively small amount of an oxide of molybdenum.

8. A process for the production of aromatic hydrocarbons from aliphatic hydrocarbons of from six to twelve carbon atoms, which comprises dehydrogenating and cyclicizing the aliphatic hydrocarbon by subjecting to a temperature of the order of 400 to 700° C., for a time period of less than 50 seconds but sufficient to dehydrogenate and cyclicize the aliphatic hydrocarbon, in the presence of an aluminum axide catalyst containing a relatively small amount of an oxide of tungsten.

ARISTID V. GROSSE.